United States Patent
Perks

(10) Patent No.: US 6,303,893 B1
(45) Date of Patent: Oct. 16, 2001

(54) RESISTANCE PROJECTION WELDER AND METHOD THEREFOR

(75) Inventor: David L. Perks, Allendale, MI (US)

(73) Assignee: Perks MFG Engineering Company, Allendale, MI (US)

( * ) Notice: Subject to any disclaimer, the term of this patent is extended or adjusted under 35 U.S.C. 154(b) by 0 days.

(21) Appl. No.: 09/429,086

(22) Filed: Jul. 21, 2000

(51) Int. Cl.[7] .............. B23K 11/14; B23K 11/30
(52) U.S. Cl. ............... 219/93; 219/86.24; 219/86.41; 219/91.1
(58) Field of Search .................... 219/93, 92, 86.24, 219/86.41, 91.1

(56) References Cited

U.S. PATENT DOCUMENTS

| | | | | |
|---|---|---|---|---|
| 3,573,423 | * | 4/1971 | Medlin | 219/119 |
| 4,447,697 | * | 5/1984 | Dunne et al. | 219/86.41 |
| 4,694,135 | * | 9/1987 | Nagel et al. | 219/110 |
| 4,754,116 | * | 6/1988 | Naruse et al. | 219/78.01 |
| 4,788,411 | * | 11/1988 | Skinner | 219/127 |
| 4,789,768 | * | 12/1988 | Tobita et al. | 219/78.01 |
| 5,632,912 | * | 5/1997 | Cecil | 219/110 |
| 5,705,784 | * | 1/1998 | Aoyama et al. | 219/119 |
| 5,814,720 | * | 9/1998 | Visscher | 73/37 |
| 5,895,584 | * | 4/1999 | Sakota | 219/86.24 |
| 6,008,463 | * | 12/1999 | Aoyama et al. | 219/119 |
| 6,184,487 | * | 2/2001 | Visscher | 219/91.1 |

* cited by examiner

Primary Examiner—Tom Dunn
Assistant Examiner—Colleen P. Cooke
(74) Attorney, Agent, or Firm—Rader, Fishman, Grauer & McGarry

(57) ABSTRACT

A resistance projection welder for welding first and second work pieces to each other. The first work piece having a body with opposing sides with at least one projection extending from one of the opposing sides and contacting the second work piece to space the body from the second work piece and define an air gap therebetween when the first and second work pieces are properly oriented. First and second electrodes electrically couple with work pieces and apply an electrical current thereto. A source of pressurized air directs a stream of pressurized air toward an interface between the first work piece and one of the second work piece and the first electrode. An air flow sensor detects the flow rate of the air stream directed toward the interface and determines if the work pieces are properly oriented based on the detected air flow rate.

18 Claims, 4 Drawing Sheets

RESISTANCE PROJECTION WELDER AND METHOD THEREFOR

BACKGROUND OF THE INVENTION

1. Field of the Invention

The invention relates to a resistance projection welder for welding together first and second work pieces, one of which has a series of projections contacting the other work piece to establish electrical conductivity between the work pieces and form the weld therebetween; and, more particularly, sensing the relative orientation between the first and second work pieces in determining if the orientation is proper.

2. Related Art

Resistance welding is a well-known technique for welding together two work pieces, especially sheet metal and similar materials. A typical resistance welder comprises spaced electrodes between which are positioned the two work pieces to be welded together. The electrodes are brought into contact with the two work pieces and clamp the work pieces together. An electric current is then passed from one electrode to the other through the work pieces. The resistance of the work pieces generates sufficient heat to render the metal semi-molten, forming a weld nugget between the two work pieces and thereby welding them together.

In a resistance projection welding process, one of the work pieces has a series of projections extending from a body of the one work piece. The work pieces are oriented such that the projections from the one work piece contact the other work piece to conductively couple together the work pieces. The electrodes clamp the first and second work pieces together. Electric current applied through the work piece travels through the projections, heating the projections and the material of the other work piece in contact with the projections. The projections form a weld nugget along with the corresponding contacting portions of the other work piece. In essence, the projections provide additional material to form a weld nugget between the first and second work pieces.

In a resistance projection welding process, it is very important for the work pieces to be properly oriented. That is, it is very important for the projections to extend from the one work piece body to the other work piece, instead of the body of the one work piece contacting the other work piece and the projections extending away from the other work piece. Since many resistance projection welding processes produce high volume output, it is possible for the work pieces to be improperly oriented. It is desirable to have a simple, reliable and reproducible method for determining the proper orientation of the work pieces prior to their welding together.

One previous attempt to determine the orientation of the work pieces in a resistance projection welding process relied on applying a source of pressurized air to the electrode contacting the work piece with the projections and measuring the back pressure in the air system. If the work pieces were properly aligned, the work piece with the projections would substantially block the flow of air exiting the air system and thereby increase the back pressure in the air system. Alternatively, if the work piece with the projections was improperly aligned, the projections would form an air gap relative to the electrode permitting the escape of air from the air system and reducing the back pressure within the air system. This solution proved inadequate as the system was not capable of discerning fine changes in back pressure indicative of proper or improper orientation of the work pieces, resulting in either two few or two many indications of improper orientation.

It is still desirable to have a resistance projection welding apparatus and method capable of identifying when the work pieces are properly oriented prior to their welding. However, the apparatus and method must be capable of repeatedly and accurately discerning the orientation of the work pieces.

SUMMARY OF THE INVENTION

The invention relates to a resistance projection welder for welding first and second work pieces to each other. The fist work piece has a body with opposing sides, with at least one projection extending from one of the opposing sides and contacting the second work piece to thereby space the body from the second work piece and define an air gap therebetween when the first and second work pieces are properly oriented. The resistance projection welder comprises first and second electrodes that are spaced relative to each other for receiving the first and second work pieces therebetween. The electrodes are movable relative to each other from the spaced position to an electrically coupled position where the first electrode is adjacent the first work piece and the second electrode is adjacent the second work piece. The electrodes are electrically coupled to a source of electrical current for applying an electrical current through the first and second work pieces. A source of pressurized air is provided for directing a stream of pressurized air toward an interface between the first work piece and one of the second work piece and the first electrode. An air flow sensor is provided for detecting the air flow rate of the air stream directed toward the interface to determine if the work pieces are properly oriented based on the detected air flow rate.

Preferably, the resistance projection welder comprises a controller coupled to the air flow sensor and the electrodes for applying an electrical current to the electrodes and through the work pieces when the air flow sensor indicates that the work pieces are properly oriented. The controller can include a status indicator, such as an indicator light, for informing an operator of the resistance projection welder of the proper or improper orientation of the work pieces.

An actuator can be provided to move the electrodes from the spaced position to the electrically coupled position. Preferably, the actuator is a manually controlled actuator operated by the welding operator.

The source of pressurized air is preferably mounted to the first electrode and positioned to direct the stream of pressurized air toward the interface between the first work piece and the first electrode. The first electrode can include an orifice extending through an end of the electrode that abuts the first work piece when the first electrode is in the electrically coupled positioned and the source of pressurized air is fluidly coupled to the orifice to direct the stream of pressurized at the interface between the first electrode and the first work piece. The second electrode can include an end from which extends a pin being received within openings in the first and second work pieces to align the work pieces relative to the electrodes and each other.

The resistance projection welder can further include a pressure regulator fluidly connected between the pressurized air source and the air flow sensor for controlling the air flow rate provided to the sensor. An air filter can also be fluidly connected between the pressurized air source and the pressure regulator to remove impurities from the air flow to prevent the degradation of the air flow sensor.

In another embodiment, the invention relates to a method for resistance projection welding a first work piece to a second work piece. The first work piece has a body with opposing sides with at least one projection extending from one of the opposing sides and contacting the second work piece to space the body from the second work piece and define an air gap therebetween when the first and second work pieces are properly oriented. The method comprises: moving first and second electrodes relative to the first and second work pieces and into an electrically coupled position relative to the first and second work pieces; directing a stream of air toward an interface between the first work piece and one of the second work piece and the first electrode; determining the flow rate of the air stream directed toward the interface; and applying an electric current to the first and second work pieces if the determined air flow rate is indicative of the first and second work pieces being properly oriented.

Other objects, features, and advantages of the invention will be apparent from the ensuing description in conjunction with the accompanying drawings.

DETAILED DESCRIPTION

Figure 1:
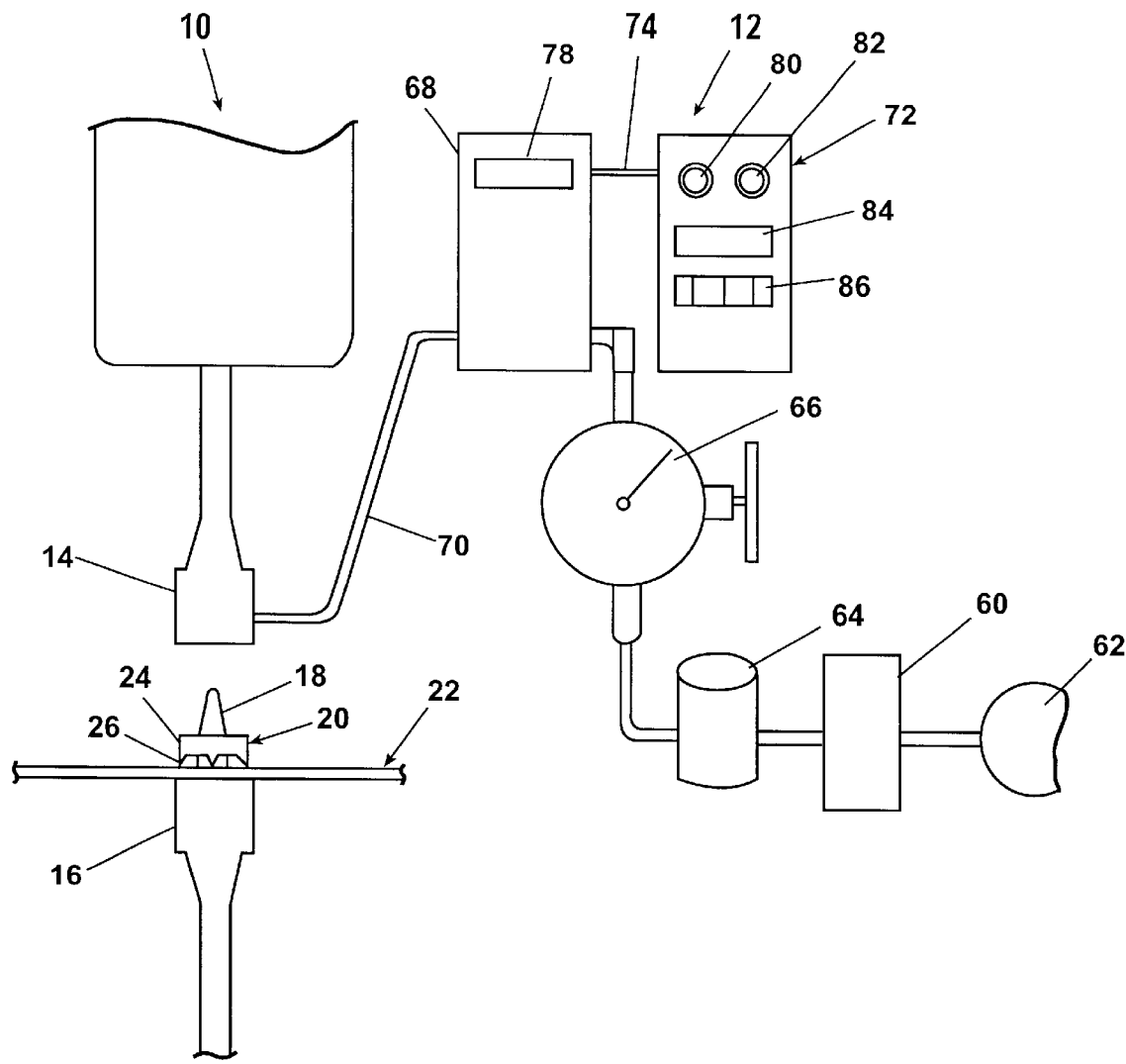
FIG. 1 is a schematic illustration of a resistance projection welder having top and bottom electrodes, with a projection nut and metal sheet mounted on thereon in combination with an air flow sensor system according to the invention.

FIG. 1 illustrates a resistance projection welder 10 in combination with an air flow sensor system 12 according to the invention that supplies a stream of air to the resistance projection welder for determining the orientation of work pieces to be welded by the resistance projection welder. Resistance projection welders are well known. Suitable resistance projection welders are manufactured by Custom Welder Builders. Therefore, only the general features of the resistance projection welder will be described herein.

Figure 2:
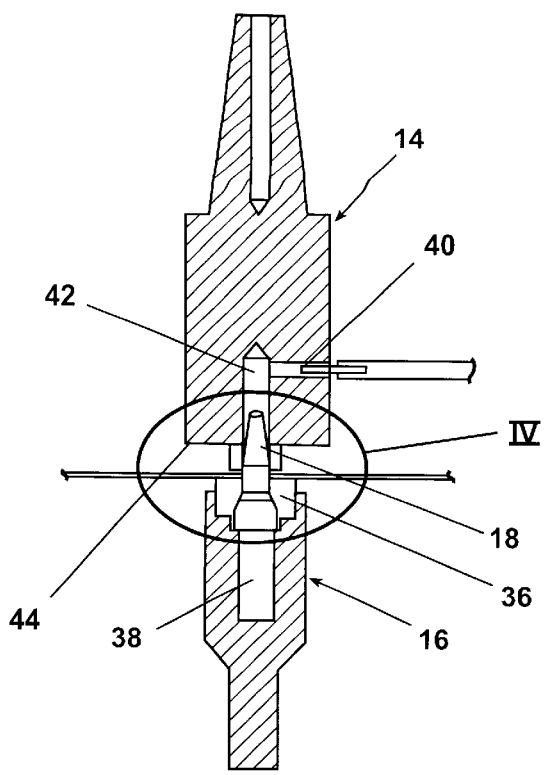
FIG. 2 is an enlarged sectional view of the electrodes for the resistance projection welder of FIG. 1 in their clamping or electrically conductive position relative to first and second work pieces of a projection nut and metal plate.
Figure 3:
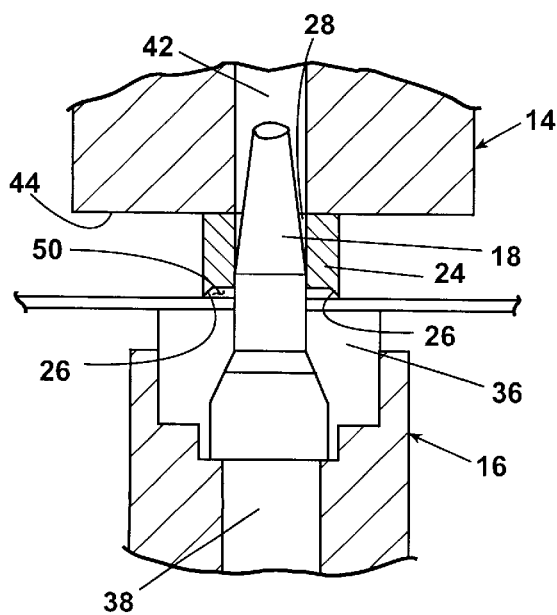
FIG. 3 is an enlarged sectional view of area IV of FIG. 2, illustrating the configuration of the electrodes relative to the work pieces when the work pieces are properly oriented.
Figure 4:
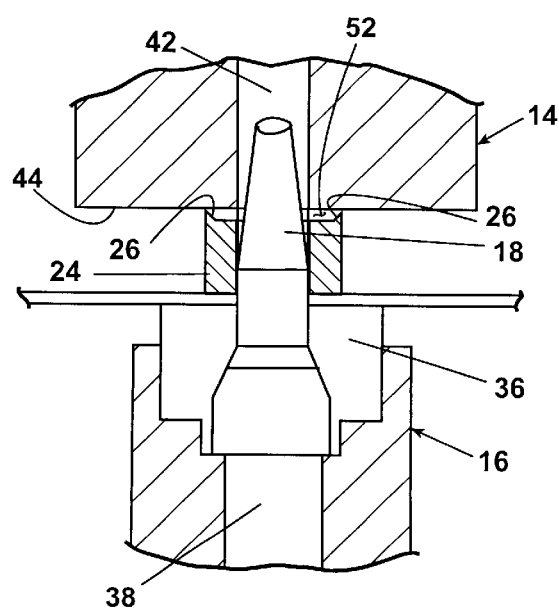
FIG. 4 is similar to FIG. 3 but illustrating the configuration of the electrodes and the work pieces when the work pieces are improperly oriented.
Figure 5:
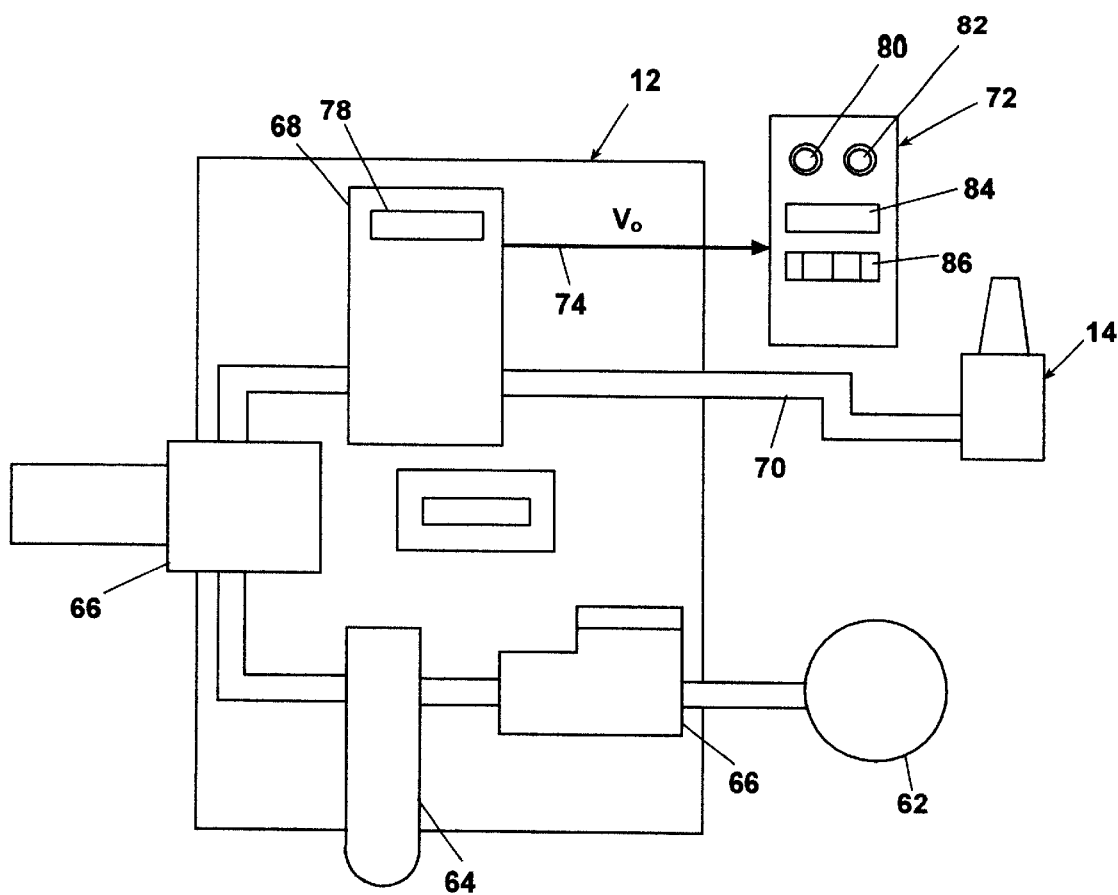
FIG. 5 is a schematic of the air flow sensor system according to the invention.

Referring to FIGS. 1–4, the resistance projection welder 10 comprises a first or top electrode 14 that is spaced in relationship to a second or bottom electrode 16. The bottom electrode 16 includes a pin 18 that is sized to be received within openings of first and second work pieces 20, 22, respectively. The top electrode 14 is moveable relative to the bottom electrode to move the electrodes 14, 16 from the spaced position (FIG. 1) to an electrically conductive and clamping position (FIGS. 2–4).

For proper operation, the top and bottom electrodes need only move relative to each other. One or both of the electrodes can move even though it is preferred that the bottom electrode be fixed to form a platform on which the first and second work pieces can be placed by an operator and the top electrode 14 is movable relative to the fixed bottom electrode 16.

The first work piece 20 is illustrated as a projection nut comprising a body 24 from which extends multiple projections 26. The second work piece 22 is illustrated as a metal sheet. When the projection nut is properly oriented relative to the metal sheet (FIG. 3), the projections 26 will contact the metal sheet 22, instead of the body 24 contacting the metal sheet 22 (FIG. 4).

It should be noted that although the invention is described with respect to the work pieces being that of a projection nut and a metal sheet, the invention is applicable to any type of materials that are resistance projection welded. For example, the first and second work pieces just as easily could be two planar sheets as long as one of the sheets has the necessary projections.

Additionally, the invention can use electrodes of different configuration. For example, the bottom electrode 16 need not necessarily have the pin 18 to align the first and second work pieces. The pin 18 is only needed in situations where the work pieces traditionally have openings, such as in the projection nut.

Referring to FIGS. 2–3, the top electrode 14 includes a radial channel 40 extending from the exterior of the top electrode 14 to an axial blind orifice 42 that terminates at a lower end 44 of the top electrode 14. The radial channel 40 and axial orifice 42 collectively form a fluid passageway from the exterior of the top electrode 14 to the lower end 44. Preferably, the axial orifice 42 has a diameter sized to receive the tapered end of the pin 18. A diameter that is at least equal to the opening 28 of the body 24 will normally be adequate. It is preferred that the diameter of the axial orifice 42 not exceed the outer diameter of the body 24 to ensure that the interface between the lower end 44 of the top electrode 14 and the body 24 substantially forms a seal when the projection nut is oriented properly with respect to the metal sheet 22.

The pin 18 of the bottom electrode 16 is received within a mounting collar 36. Both the pin 34 and the mounting collar 36 are received within a stepped opening 38 in the bottom electrode.

Referring to FIG. 3, when the first and second work pieces 20, 22 are properly oriented and the electrodes are in the electrically conductive position, the projections 26 extending from the body 24 abut the second work piece 22 to define an interface between the first work piece 20 and the second work piece 22. In this orientation, the lower end 44 of the top electrode 14 abuts the body 24 of the projection nut and effectively forms a fluid tight seal therewith while defining an interface between the body 24 and the end 44 of the top electrode 14. The metal sheet 22 is supported by and rests on the mounting collar 36 of the bottom electrode 16. The pin 18 axially aligns the projection nut opening with the metal sheet opening. An air gap 50 is formed between the projection nut body 24 and the metal sheet 22.

Referring to FIG. 4, if the projection nut is improperly oriented with respect to the metal sheet, the projection nut body 24 will abut the metal sheet 22 defining an interface therebetween, instead of the projections 26. The lower end 44 end of the top electrode 14 contacts the projections 26 of the body 24, defining an interface between the second work piece and the lower end 44 and forming an air gap 52 at the interface between the top electrode lower end 44 and the projection nut.

Thus, when the projection nut is properly oriented with respect to the metal sheet, the air gap 50 is located at the interface between the projection nut body 24 and the metal sheet 22 and the lower end 44 of the top electrode 14 contacts and forms a seal with the projection nut body 24. However, when the projection nut is improperly oriented with respect to the metal sheet, the air gap 52 is located at the interface between the top electrode lower end 44 and the projection nut body 24 and a seal is formed at the interface between the projection nut body 24 and the metal sheet 22.

Referring to FIGS. 1–5 in general and 1 and 5 specifically, the air flow sensor system 12 comprises a valve 60 fluidly connected to a source of pressurized air 62. The valve 60 is preferably a solenoid operated valve and controls the introduction of pressurized air from the pressurized air source 62 into the air flow sensor system 12. The output of the valve 60 is fluidly connected to an air filter 64 whose output is connected to a pressure regulator 66. The pressure regulator 66 is fluidly connected to the input of an air flow meter 68. The output of the air flow meter 68 is fluidly connected through a hose 70 to the radial channel 40 of the top electrode 14. The air flow meter 68 is electrically coupled to a controller 72 along line 74.

The air filter 64 serves to filter the air introduced into the air flow sensor system 12 from the pressurized air source 62 through the valve 60 before the air enters the pressure regulator 66. The pressure regulator 66 permits the user to set the pressure of the air being input into the air flow meter 68 and thereby effectively set the maximum air flow rate through the air flow meter 68.

The air flow meter 68 includes a display 74 that indicates a value representing the rate of air passing through the air flow meter. The value is preferably an air flow rate in units of volume per time but can also be a voltage amount that is proportional to the measured air flow rate. The air flow meter 68 outputs a voltage $V_O$ that is proportional to the air flow rate measured by the air flow meter.

The air flow meter 68 should be very sensitive in order to measure the small changes of air flow which will be indicative of the orientation of the work pieces. It is preferred that the air flow meter have multiple operational modes, which are related to flow rate ranges. A suitable air flow meter 68 is described in U.S. Pat. No. 4,487,062 whose description is incorporated by reference.

The controller 72 includes a "go" indicator light 80 and a "no go" indicator light 82, a display 84, and a user input panel 86. The user input panel 86 is used to set a predetermined value by which the controller controls the activation of the "go" 80 or "no go" 82 indicator lights and the application of the an electrical current to the electrodes 14, 16. A suitable controller is the Micro P Controller model MROHRH-MV13 sold by Electro Numerics, Inc. of Temecula, Calif.

The operation of the resistance projection welder is generally straight forward. Initially, the operator will input a predetermined reference value in the controller. For the first embodiment where the pressurized air stream is directed toward interface between the top electrode end 44 and the first work piece and an improper orientation will place the air gap at the interface where the air stream is directed, the reference value represents an upper threshold air flow rate value. A measured air flow rate below the threshold value is indicative of the work pieces being properly oriented. A measured air flow rate above the threshold value is indicative of an improper orientation. If the air stream is directed at an interface where the air gap is located when the work pieces are properly aligned, the predetermined reference value represents a lower threshold value, since proper orientation results in a high flow rate.

The predetermined reference value is determined by testing for each set of work pieces and for the interface location of the directed air stream. The predetermined reference value can also be dependent on the particular air flow rate supplied to the air flow meter as regulated by the regulator. The air flow rate supplied to the air flow meter is dependent on the particular operational mode selected.

Once the operator inputs the proper predetermined reference value, the use will, if necessary, adjust the air flow rate supplied to the air flow meter 68 by adjusting the regulator 66.

The first and second work pieces 20, 22 are then slidably mounted onto the pin 18 of the bottom electrode 16. The operator then actuates the relative movement of the top 14 and bottom 16 electrodes to move the electrodes from the spaced position to the electrically conductive and clamped position. During this time, pressurized air is being directed from the air source 62 through the air flow meter 68 and out through the axial orifice 42 in the end 44 of the top electrode.

When the top electrode 14 is in contact with the first work piece 20, if the work pieces are properly oriented, the air gap 50 is located opposite the interface between the body 24 and the end 44 where the air stream is directed. Since the contact between the body 24 and the end 44 substantially fluidly seals the top electrode 14 relative to the first work piece 20 and the pin 18 substantially fluidly seals the opening of the first work piece, the air stream flow rate exiting the orifice 42 is substantially choked off, which results in a drop in the air flow rate through the air flow meter 68.

The air flow meter 74 sends a signal $V_O$ representative of the measured air flow rate to the controller 72, which compares the measured air flow rate against the predetermined reference value. Since the parts are properly aligned, the controller will illuminate the "go" indicator 80 and send an electric current through the electrodes to weld together the first and second work pieces. It is not necessary that the controller control the application of the electrical current to the electrodes. The operator can manually apply the electrical current in response to the illumination of the "go" indicator.

If the first and second work pieces 20, 22 are improperly aligned as shown in FIG. 4, the air gap 52 will face and be in fluid contact with the interface at which the air stream is directed and the body 24 and end 44 no longer form a fluid seal. The flow rate of the air exiting the orifice 42 will be substantially greater than the flow rate when the parts are properly aligned. The air flow sensor will send a signal $V_O$ to the controller representative of the greater air flow rate. The controller compares the signal to the predetermined reference value and determines it to be greater, meaning the work pieces are not properly aligned, and the controller illuminates the "no go" indicator 82 and does not apply an electrical current to the electrodes.

Although the embodiment in FIGS. 1–5 illustrate the invention when the air stream is directed at an interface between the first work piece and the top electrode, where a high flow rate is indicative of improper alignment and a low flow rate is indicative of proper alignment, the invention can also be configured so that the air stream is directed to an interface where the air gap is present when the first and second work pieces are properly aligned. As described above, in such a case, the measured air flow rate would have an opposite indication. That is an air flow rate larger than the predetermined reference value would indicate proper alignment and an air flow rate less than the predetermined reference value would indicate an improper alignment.

Figure 6:
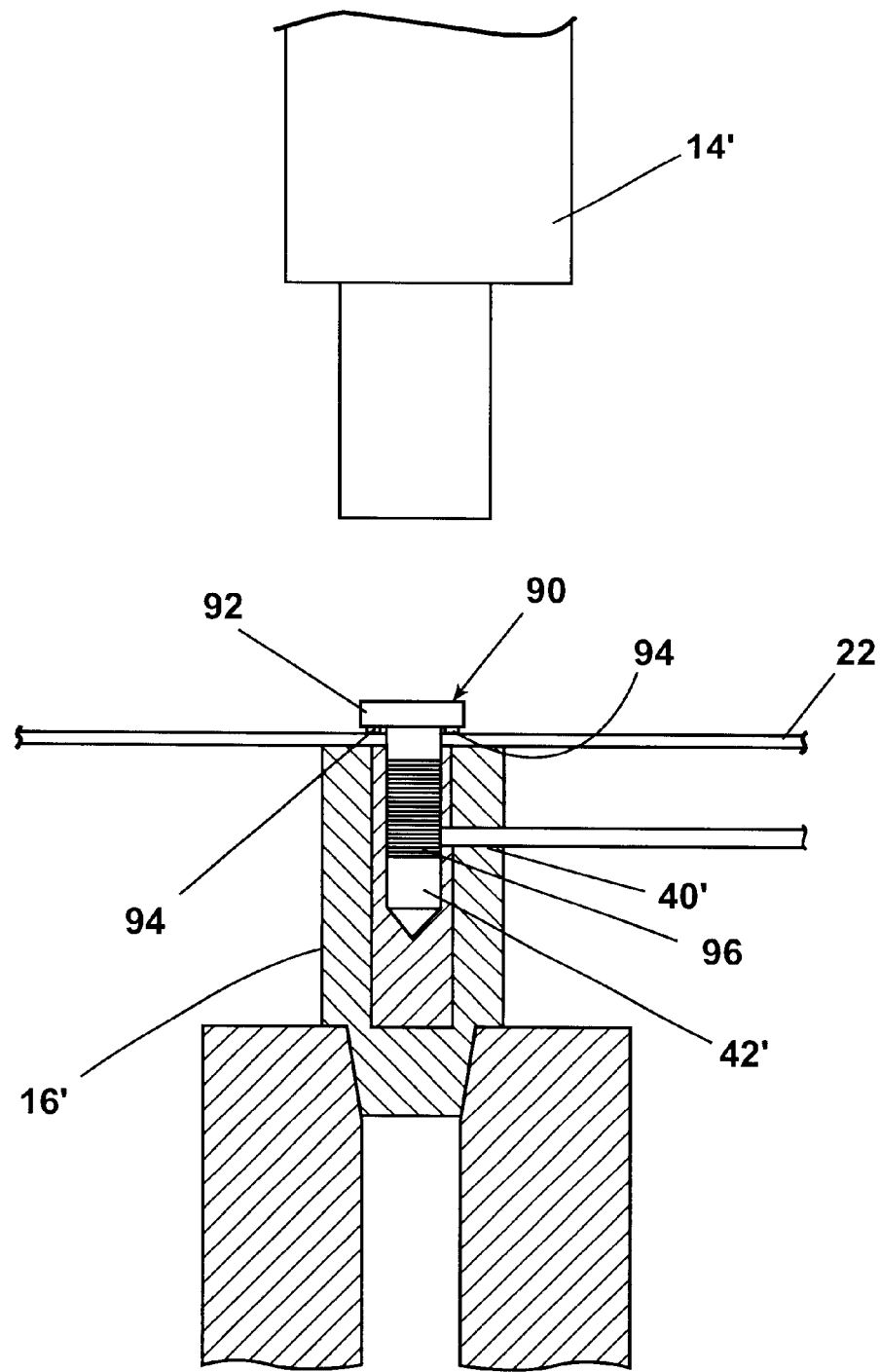
FIG. 6 illustrates an alternative electrode configuration for use with a projection stud instead of the projection nut illustrated in FIGS. 1–5.

FIG. 6 illustrates an alternative structure for the resistance projection welder according to the invention. The alternative construction is suitable for the resistance projection welding process where the first work piece 20 is a projection stud 90 and the second work piece 22 is again a metal sheet. The projection stud 90 includes a head 92 from which extends multiple projections 94 and a traditional stem 96.

The configuration of the stud 90 requires that the air flow sensor system 12 be coupled to the bottom electrode 16' instead of the top electrode 14' as in the first embodiment. The bottom electrode 16' includes a radial channel 40' extending from the exterior of the bottom electrode 16' into the interior thereof where it makes fluid contact with an axial orifice 42' sized to receive the stem 96 of the stud 90.

The manner of operation of the alternative embodiment disclosed in FIG. 6 is identical to that disclosed in the first embodiment except that the air is introduced into the bottom electrode 16 instead of the top electrode 14.

While the invention has been specifically described in connection with certain specific embodiments thereof, it is to be understood that this is by way of illustration and not of limitation, and the scope of the appended claims should be construed as broadly as the prior art will permit.

What is claimed is:

1. A resistance projection welder for welding first and second work pieces to each other, the first work piece having a body with opposing sides with at least one projection extending from one of the opposing sides and contacting the second work piece to space the body from the second work piece and define an air gap therebetween at a first interface between the first and second work pieces when the first and second work pieces are properly oriented, the resistance projection welder comprising:
    first and second electrodes spaced relative to each other for receiving the first and second work pieces therebetween, the electrodes being moveable relative to each other from the spaced position to an electrically coupled position where the first electrode is adjacent the first work piece to define a second interface between the first electrode and the first work piece and the second electrode is adjacent the second work piece, and the electrodes being adapted for applying an electrical current to the first and second work pieces;
    a source of pressurized air for directing a stream of pressurized air toward one of the first and second interfaces; and
    an air flow sensor for detecting the flow rate of the air stream directed toward one of the first and second interfaces and detecting if the work pieces are properly oriented based on the detected air flow rate.

2. The resistance projection welder according to claim 1, and further comprising a controller coupled to the air flow sensor and the electrodes for applying an electrical current to the electrodes when the air flow sensor indicates that the work pieces are properly oriented.

3. The resistance projection welder according to claim 2 wherein the controller further comprises a status indicator for informing an operator of the proper or improper orientation of the work pieces.

4. The resistance projection welder according to claim 3 wherein the status indicator is a light.

5. The resistance projection welder according to claim 1, and further comprising an actuator to move the electrodes from the spaced position to the electrically coupled position.

6. The resistance projection welder according to claim 5 wherein the actuator is a manual actuator controlled by an operator.

7. The resistance projection welder according to claim 1 wherein the source of pressurized air is mounted to one of the first and second electrodes.

8. The resistance projection welder according to claim 7 wherein the source of pressurized air is positioned to direct the stream of pressurized air toward the second interface.

9. The resistance projection welder according to claim 8 wherein the first electrode comprises an end with an orifice that abuts the first work piece when the first electrode is in the electrically coupled position and the source of pressurized air is fluidly coupled to the orifice to direct the stream of pressurized air at the second interface.

10. The resistance projection welder according to claim 9 wherein the second electrode comprises an end from which extends a pin for being received within openings in the first and second work pieces to align the first work piece and the second work piece.

11. The resistance projection welder according to claim 9 wherein the air flow sensor sends a signal indicating the proper orientation of the first and second work pieces when the detected air flow rate is below a predetermined value.

12. The resistance projection welder according to claim 9 wherein the air flow sensor is disposed inline between the source of pressurized air and the first electrode.

13. The resistance projection welder according to claim 9, and further comprising a pressure regulator fluidly connected between the pressurized air source and the air flow sensor.

14. The resistance projection welder according to claim 13 and further comprising an air filter fluidly connected between the pressurized air source and the pressure regulator.

15. The resistance projection welder according to claim 13, and further comprising a controller coupled to the air flow sensor and the electrodes for applying an electrical current to the electrodes when the air flow sensor indicates that the work pieces are properly oriented.

16. A method for resistance projection welding a first work piece to a second work piece, the first work piece having a body with opposing sides, with at least one projection extending from one of the opposing sides and contacting the second work piece to space the body from the second work piece and define an air gap therebetween at a first interface between the first and second work pieces when the first and second work pieces are properly oriented, the method comprising:
    moving first and second electrodes relative to the first and second work pieces and into an electrically coupled position where the first electrode is adjacent the first work piece to define a second interface between the first electrode and the first work piece and the second electrode is adjacent the second work piece;
    directing a stream of air toward one of the first and second interfaces;
    determining the flow rate of the air stream directed toward one of the first and second interfaces; and
    applying an electric current to the first and second work pieces if the determined air flow rate is indicative of the first and second work pieces being properly oriented.

17. The method according to claim 16 wherein the air stream is directed at the second interface.

18. The method according to claim 17 wherein the air flow rate is indicative of the first and second work pieces being properly oriented when the air flow rate is below a predetermined value.

* * * * *